Patented July 6, 1926.

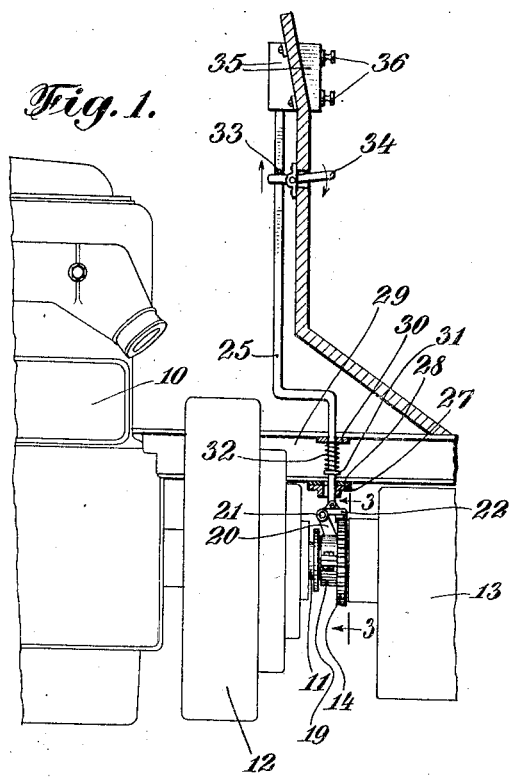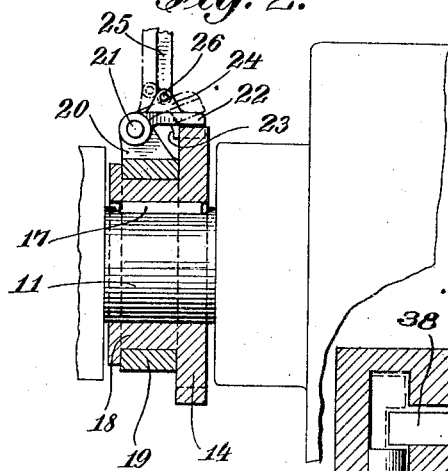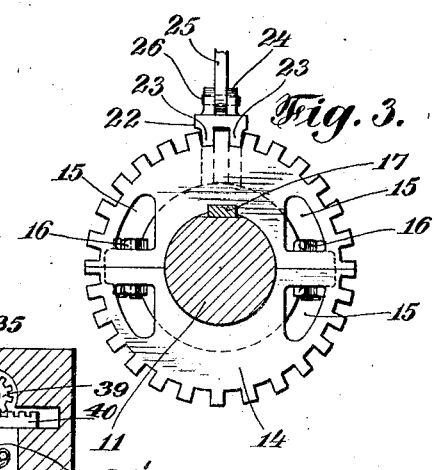

1,591,541

UNITED STATES PATENT OFFICE.

ABRAHAM M. LIVINGSTON, OF NEW YORK, N. Y.

AUTOMOBILE LOCKING DEVICE.

Application filed February 24, 1921. Serial No. 447,468.

This invention relates generally to automobile locking devices, and particularly to the kind whereby the engine shaft of a vehicle may be rendered inoperative if desired.

One of the objects of my invention is to provide simple, inexpensive and readily applicable means adapted to be associated with the engine shaft, preferably at a point between the engine and the clutch or between the engine and the gear shift, whereby the engine may be prevented from being started.

Another object of my invention is to provide in connection with this means directly attached to the shaft, a locking device operable from the driver's seat, which will normally be in locking engagement with said means attached to the shaft, but which may be disengaged manually by the operator.

Another object of my invention is to provide in connection with said shaft locking means, other locking means by way of which the shaft locking means may be held in either operative or inoperative position.

The foregoing and still further objects will be more fully apparent from the following description and the accompaning drawings, showing preferred forms of my invention and forming part of this specification, in which:

Fig. 1 represents a cross section thru part of a car body disclosing my device attached between the fly wheel and the gear shift of an automobile engine.

Fig. 2 is a sectional detail view thru my device.

Fig. 3 is a front elevation of the same, showing the engine shaft in section.

Fig. 4 is a sectional detail view of the lock.

Referring to the figures, numeral 10 represents an engine with the shaft 11, flywheel 12 and gear box 13. Between the flywheel and the gear box a split toothed wheel 14 is attached, provided with recess 15 for receiving the heads and the nuts of bolts 16, by means of which the wheel is clamped to shaft 11. In order to prevent the wheel from turning, a shaft key 17 is provided.

In Fig. 2, the toothed wheel 14 is shown possessing a recessed neck 18 and in its recessed portion a stationary split collar 19 is mounted.

At the upper portion of the collar a bracket 20 is provided having a pin 21, forming the pivot for pawl 22, provided with teeth 23, the latter adapted to engage the toothed wheel 14.

At the upper face of pawl 22, a bifurcated lug 24 extends upward and receives between its bifurcated portion a rod 25 pivoted at 26.

The lower portion of rod 25 is guided in a slotted flange 27 (Fig. 1) which is attached to a cross bar 28, which is secured to the lower part of frame 29 of the vehicle. Rod 25 also passes through another bar 30.

Attached to the rod 25 below the bar 30 is a washer 31. Between the washer and the bar is provided an expansion spring 32, pressing the rod 25 normally downward, thus causing pawl 22 to engage the teeth of wheel 14.

At the upper portion of rod 25, a pin 33 passes therethrough by means of which the rod may be elevated. This may be accomplished by pressing down lever 34 engaging the pin 33.

The upper end of rod 25 passes into a combination lock 35, provided with setting knobs 36 which are operable from the driver's seat.

Referring to Figure 4, it will be seen that the upper end of the rod 25 is provided with a recess 37 adapted to be engaged by locking bolt 38 normally pressed into its locking position by spring 38' and operated by the upper knob 36 by means of a gear 39 engaging the teeth 40 of bolt 38. When rod 25 is at its normal position as shown in full lines in Fig. 4, locking bolt 38 bears against the top of the rod.

When the car is to be made inoperative, the combination lock 35 is set so that it releases rod 25. Expansion spring 32 will cause pawl 22 to engage the toothed wheel 14, and when the pawl is in locking position with the wheel, the engine is prevented from being started or otherwise operated. When the pawl is thus set, the knobs 36 of the combination lock 35 are now turned so as to prevent the elevating of pawl 22 from its engaging position.

When the car is to be started the combination lock is again set in a pre-arranged way to release the rod 25 and to permit the driver to lift the bar by means of lever 34, thus disengaging pawl 22 from wheel 14.

In a great many cases, it will be found that the construction of the design of an engine leaves very little space between the engine shaft and the fly-wheel and therefore it would be difficult to apply my device when constructed in the manner shown in Figs. 1 or 2.

While I have shown a so-called combination lock at the dash board, to engage bar or lever at 25, be it understood that any other kind of known locks, as for instance, key locks, cylinder locks, may be employed, if properly adapted to this particular use.

Having thus described my invention, I claim:

In an engine driven vehicle including an engine shaft, as the driving element, a power transmission as the driven element, and a dash board, a lock and spring controlled device associated with said shaft and adapted to normally prevent the operation of said shaft while permitting the free operation of said transmission when the vehicle is manually moved, said device comprising a sleeved gear keyed to said shaft, a collar in gliding fit with the sleeve of the gear, a pawl cooperating with said sleeve and adapted to engage said gear, a spring actuated connecting rod associated with said pawl, a lock provided at the dash board and adapted to receive and lock said rod in desired positions, and a lifting lever provided at the dash board, engaging said rod and adapted to lift said pawl out of engagement with said gear.

Signed at New York, in the county of New York and State of New York, this 14th day of February A. D. 1921.

ABRAHAM M. LIVINGSTON.